United States Patent
Mulligan et al.

(10) Patent No.: US 10,311,060 B2
(45) Date of Patent: Jun. 4, 2019

(54) GLYPH MANAGEMENT IN TEXTURE ATLASES

(71) Applicant: Espial Group Inc., Ontario (CA)

(72) Inventors: Michael Damian Mulligan, Ontario (CA); Samvel Avanesov, Ontario (CA); Michael Hall, Ontario (CA)

(73) Assignee: Espial Group Inc., Ontario (CA)

( * ) Notice: Subject to any disclaimer, the term of this patent is extended or adjusted under 35 U.S.C. 154(b) by 0 days.

(21) Appl. No.: 15/615,063

(22) Filed: Jun. 6, 2017

(65) Prior Publication Data

US 2018/0349444 A1 Dec. 6, 2018

(51) Int. Cl.
| | |
|---|---|
| *G09G 5/00* | (2006.01) |
| *G06F 16/2455* | (2019.01) |
| *G06T 11/00* | (2006.01) |
| *G06T 15/04* | (2011.01) |
| *G06T 1/60* | (2006.01) |

(52) U.S. Cl.
CPC .......... *G06F 16/24561* (2019.01); *G06T 1/60* (2013.01); *G06T 11/001* (2013.01); *G06T 15/04* (2013.01)

(58) Field of Classification Search
None
See application file for complete search history.

(56) References Cited

U.S. PATENT DOCUMENTS

| | | | | |
|---|---|---|---|---|
| 8,988,434 | B1 * | 3/2015 | Roth | G06T 11/001 345/467 |
| 2005/0271302 | A1 * | 12/2005 | Khamene | G06K 9/00986 382/294 |
| 2008/0094411 | A1 * | 4/2008 | Parenteau | G06T 15/503 345/592 |
| 2009/0285496 | A1 * | 11/2009 | Collins | G06F 3/14 382/232 |
| 2011/0043528 | A1 * | 2/2011 | Solomonov | G09G 5/222 345/467 |
| 2011/0205238 | A1 * | 8/2011 | Wallace | G06F 9/451 345/589 |
| 2013/0063463 | A1 * | 3/2013 | Clark | G09G 5/00 345/582 |
| 2013/0120657 | A1 * | 5/2013 | Dick | G09G 5/393 348/607 |
| 2013/0162652 | A1 * | 6/2013 | Dowling | G06T 11/203 345/467 |
| 2014/0320527 | A1 * | 10/2014 | Cohen | G06T 1/60 345/629 |

(Continued)

*Primary Examiner* — Anh-Tuan V Nguyen
(74) *Attorney, Agent, or Firm* — Carter, Deluca & Farrell LLP; George Likourezos

(57) ABSTRACT

Provided are methods and systems of glyph management using texture atlases that may, among other things, improve User Interface (UI) performance and quality, as well as reduce memory requirements for storing glyphs. Due to their monochrome nature, glyphs are stored on any one of the red, green, blue, or alpha color channels that exist within a texture memory. Commonly used glyphs may be used to generate an initial texture atlas or texture atlases. Texture atlases may also be dynamically updated as additional glyphs are needed. Required glyphs needed to be displayed in a UI may be provided from the texture atlas to a graphics processor, and the graphics processor can use texture information to render the glyphs in the UI.

16 Claims, 13 Drawing Sheets

(56) References Cited

U.S. PATENT DOCUMENTS

2016/0247252 A1\* 8/2016 Seeley ................ G06F 12/0875
2017/0039739 A1\* 2/2017 Doran ................... G06T 11/203
2018/0096496 A1\* 4/2018 Lobaugh ............... G06T 11/001

\* cited by examiner

GLYPH MANAGEMENT IN TEXTURE ATLASES

TECHNICAL FIELD

The present disclosure relates to glyph management in texture atlases, and in particular to the storage of glyphs within texture atlases for rendering in a user interface generated by a computing device.

BACKGROUND

Drawing text in a user interface (UI) is currently a time-consuming and memory-intensive process. For each character in the text to be displayed in the UI, an outline description of the character must be rendered into pixels to create a glyph image, drawn into an off-screen buffer, and combined with any other UI elements that are being drawn. In order for the text to be drawn in the UI, the pixels of the glyph that have been rendered and drawn into the buffer are provided to a graphics processor as a texture. This may require several memory buffers, and copying of data between them. If a system has limited amounts of texture memory, repeated copying of texture data may be required in order to make the best use of the available memory.

A texture atlas improves the efficiency of drawing glyphs in a UI because the texture atlas can be loaded into a graphics memory buffer once and avoids repeated copying of small textures. However, if the texture atlas is created prior to use it must contain every glyph in every font that can possibly be drawn for display in the UI. This can be inefficient if only a subset of glyphs are commonly used. Furthermore, a given entry in a texture atlas is specific to the combination of parameters that apply to the glyph, for example the size of the font and the font face being used. Therefore each different combination of parameters for a given glyph require different entries in the texture atlas, which causes a strain on memory requirements.

Accordingly, additional, alternative, and/or improved methods and systems that provide glyph management using texture atlases remains highly desirable.

BRIEF DESCRIPTION OF THE DRAWINGS

Further features and advantages of the present disclosure will become apparent from the following detailed description, taken in combination with the appended drawings, in which:

FIGS. 10A thru 10D show respective red, green, blue, and alpha color channels of the texture atlas of FIG. 9.

It will be noted that throughout the appended drawings, like features are identified by like reference numerals.

DETAILED DESCRIPTION

Figure 1:
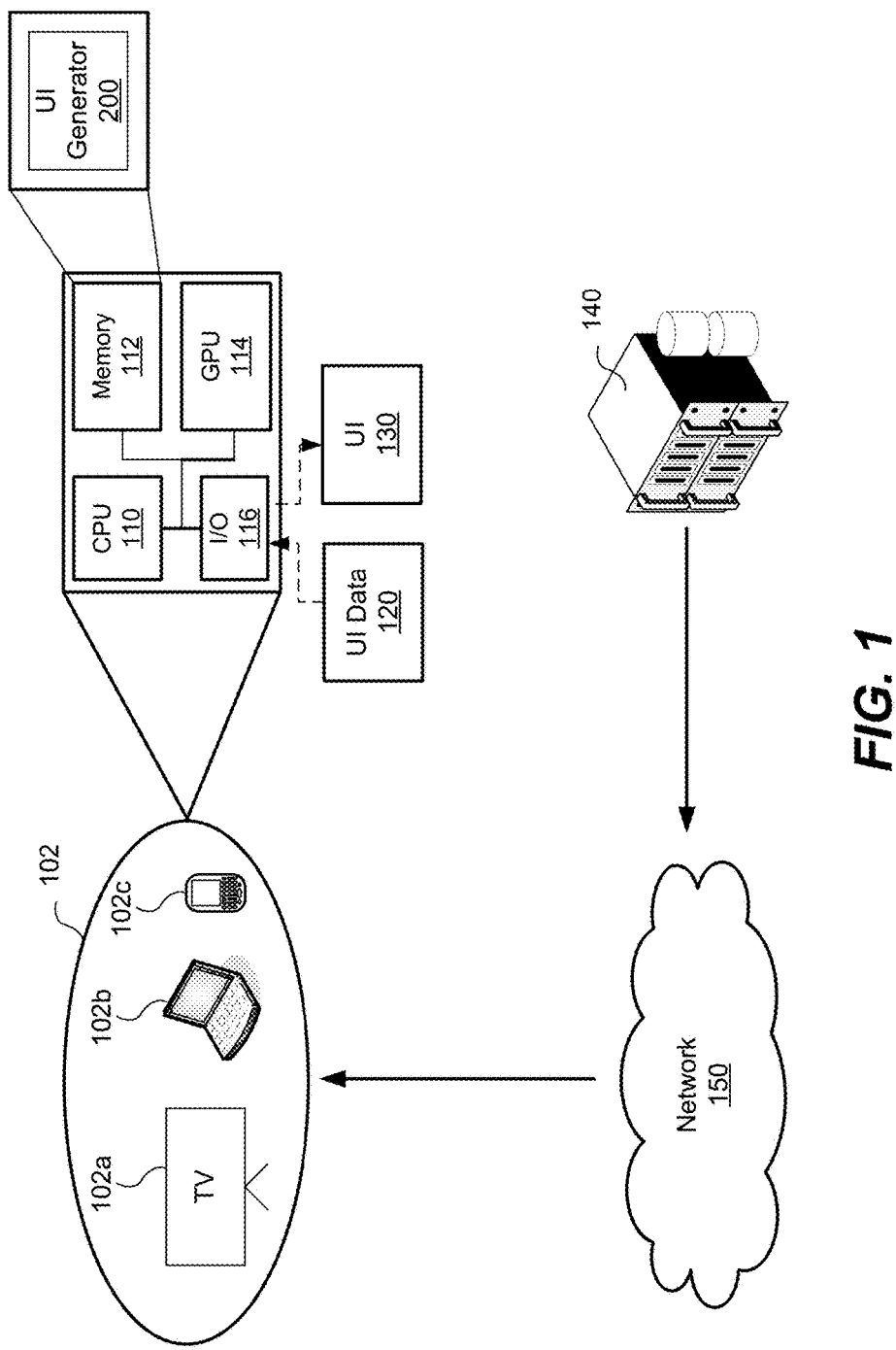
FIG. 1 shows an exemplary system that manages glyphs using texture atlases.

In accordance with one aspect of the present disclosure there is provided a method of glyph management performed by a processor, comprising: receiving one or more characters; generating a glyph image of each of the one or more characters; for each generated glyph image: storing the glyph image in only one of a plurality of red, green, blue, and alpha (RGBα) color channels of a texture atlas stored on a memory coupled with the processor; and creating an entry for the glyph image in an associated atlas index stored on the memory, the entry defining a position of the glyph image within the texture atlas; wherein an associated glyph image can be retrieved from one of the plurality of color channels of the texture atlas when required for rendering of an associated character in a user interface generated by an application executed by the processor.

In accordance with another aspect of the present disclosure there is provided a system configured to perform glyph management, comprising: a memory for storing a texture atlas comprising red, green, blue, and alpha (RGBα) color channels and an associated atlas index; and a processor operably coupled with the memory, the processor generating a glyph image for each for each of a received one or more characters and storing the generated glyph image to only one of the color channels of the texture atlas and storing an index for the glyph image in the associated atlas index, the index defining a position of the glyph image within the texture atlas; wherein an associated glyph image can be retrieved from one of the channels of the texture atlas using the atlas index when rendering of an associated character in a user interface generated by an application executed by the processor.

In accordance with another aspect of the present disclosure there is provided a non-transitory computer readable medium comprising computer-executable glyph management instructions stored thereon, the glyph management instructions comprising: receiving one or more characters; generating a glyph image of each of the one or more characters; for each generated glyph image: storing the glyph image in only one of a plurality of red, green, blue, and alpha (RGBα) color channels of a texture atlas stored on a memory coupled with the processor; and creating an entry for the glyph image in an associated atlas index stored on the memory, the entry defining a position of the glyph image within the texture atlas; wherein an associated glyph image can be retrieved from one of the plurality of color channels of the texture atlas when required for rendering of an associated character in a user interface generated by an application executed by a processor.

Other aspects and features will become apparent to those ordinarily skilled in the art upon review of the following description of specific embodiments of the disclosure in conjunction with the accompanying figures.

The present disclosure provides methods and systems of font management using texture atlases that may, among other things, improve User Interface (UI) performance and quality, as well as reduce memory requirements for storing glyph images. Stored within a memory of a computing device, such as a set-top box, mobile device, desktop computer, smartTV, etc., are software applications that may be used for generating and updating a texture atlas. Required glyphs to be displayed in a UI may be provided from the texture atlas to a graphics processor, and the graphics processor can use texture information, for example from a UV array, to render the UI. The UV array defines the mapping from a 2D to 3D model.

When an image of a glyph is generated (that is, the character has been rendered into pixels using a specific font face, size and variant, e.g. bold or italic), because glyphs are typically monochrome the glyph image may be stored in any one of the red, green, blue, or alpha (referred to as 'RGBα' herein) color channels that exist within the texture memory. This allows for up to four times the storage capacity for storing glyphs within a given texture atlas. When a character is to be drawn in a UI, the relevant glyph image is combined with a color that the glyph is to be drawn in, thus rendering the necessary glyphs in the correct color. Parameters associated with glyphs in the texture atlas may be stored in an associated atlas index, and the position of respective glyphs within the texture atlas may also be stored to facilitate retrieval of glyphs to be rendered. By using the discrete texture atlas channels for storing glyphs memory utilization on the computing device is improved four fold.

Commonly used characters may be used to generate an initial texture atlas or texture atlases. Texture atlases may also be dynamically updated as additional glyphs are needed. This may involve, upon receiving character data to be presented in a UI, determining if glyphs within the data for display exist within the texture atlas, and if a corresponding glyph is not currently within the texture atlas, adding that glyph to the texture atlas so that it may be rendered for display.

While the use of the term 'glyph' throughout the specification may be described with reference to font or textual glyphs, it should be noted that the teachings herein should not be limited to such. In particular, a glyph may include any monochrome element, including but not limited to textual characters, symbols, emojis, and the like.

Embodiments are described below, by way of example only, with reference to FIGS. 1-10.

FIG. 1 shows an exemplary system that manages glyphs using texture atlases. The devices 102a, 102b, 102c (collectively, device(s) 102) are capable of, and configured to, present data to be displayed in a UI in accordance with the teachings herein. Device 102a is exemplary depicted as a TV, device 102b is exemplary depicted as a laptop computer, and device 102c is exemplary depicted as a mobile phone device, though these examples of devices 102 are non-limiting and the teachings herein may be implemented on any device that has a UI. Any computing device having a display, or coupled to a display, where memory conservation may be required may implement the described system and methods.

The devices 102 comprise various hardware and software components, including but not limited to a CPU 110, memory 112, GPU 114, and an I/O interface 116. The CPU 110 is configured to execute instructions stored on the memory 112. The memory 112 may comprise instructions for generating a UI, such as a software application depicted as a UI generator 200. More particularly, the UI generator 200 is responsible for generating texture atlases and locating glyphs to be rendered in a UI. The memory 112 and/or UI generator 200 may comprise further software applications and/or storage capabilities. Storage components may also be located in a non-volatile storage component of device 102 (not shown), but for clarity will be described herein as being within the memory 112.

The CPU 110, when executing instructions stored within the memory 112, and in particular when executing the UI generator 200, may provide glyphs stored within a texture atlas or atlases to the GPU 114 for generating or rendering a UI 130. Executing the UI generator 200 may be performed in response to receiving UI data 120, for example through the I/O interface 116. The GPU 114 may, for example, use UV array information associated with the glyph image to be rendered in order to generate the texture within the UI 130. The UI 130 may be drawn on a screen and provided from the GPU 114 to the screen of the device 102 through the I/O interface 116. The methods for generating texture atlases and providing glyphs to the GPU 114 will be further described herein.

The UI data to be rendered and displayed in the UI may be received from a third party entity, exemplary depicted as external servers 140, and provided to the appropriate device 102. The UI data 120 may be provided to the device 102 in several different manners, for example over a network 150, broadcast connection, etc. The UI data 120 may comprise any type of data that may be displayed in a UI. The UI data 120 may, for example, be any one or more of EPG data, channel list data, data from media-on-demand catalogues or app stores, and HTML data.

Figure 2:
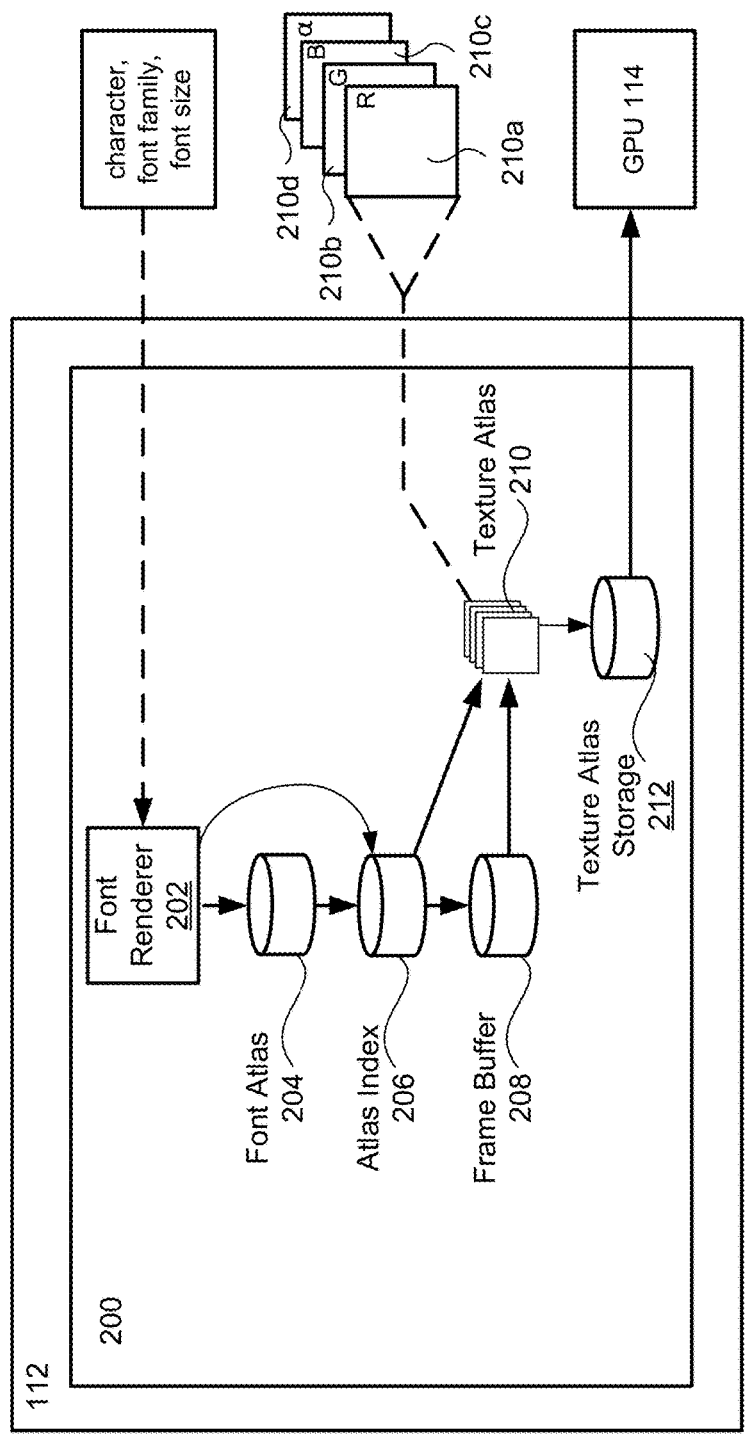
FIG. 2 shows a representation of a User Interface (UI) generation process.

FIG. 2 shows a schematic of a UI generation process. More particularly, FIG. 2 schematically depicts the actions that CPU 110 may perform when executing the UI generator 200 stored within memory 112. The UI generator 200 may be operated on top of a browser, for example an HTML5 browser, though various implementations are possible as will be readily appreciated by a person skilled in the art.

The UI generator 200 may comprise a font renderer 202, which receives characters or text to be displayed in a user interface, identifies respective glyphs within the text, and determines at least one parameter associated with each of the respective glyphs, for example, the font family (e.g. Arial), font size (e.g. 12 pt.), glyph character (e.g. 'a'), etc. The characters for being displayed in a user interface may be received from the UI data 120, or may be loaded into the memory 112 of device 102 during a configuration process, as will be further described herein. The at least one parameter associated with each of the respective characters may also be received with the characters or defined as an associated parameter, as opposed to the font renderer 202 determining the glyph parameters.

The font atlas 204 comprises instructions/rules for how to build an atlas index 206 and how the texture atlas is defined. For example, for each character received at the font renderer 202, the font atlas 204 takes a generated image of the glyph (e.g. in pixels) and stores the glyph image with associated parameters (e.g. font family, font size, etc.) in an appropriate location within the atlas index 206 based on the instructions/rules for building the atlas index 206. The atlas index 206 is used in generating a texture atlas 210, which comprises a texture with various images (not just limited to glyphs) and a list of texture atlas entries. In particular, the texture atlas 210 comprises four color channels comprising images of UI elements, the four color channels being a red channel 210a, green channel 210b, blue channel 210c, and alpha channel 210d, referred to herein as RGBα color channels. As will be described further herein, because glyphs can be stored as monochrome elements all four color channels of the texture memory may be used to store separate sets of glyphs, thus realizing up to four times the memory savings. The glyphs may be stored in one of the RGBα color channels irrespective of the actual color of the glyph. When the glyphs are to be drawn in the UI, the GPU 114 (using an OpenGL shader, for example) may combine the relevant glyph image within the texture atlas with the color that the character is to be drawn in, thus rendering the necessary glyphs in the correct color. The other images that may be stored in a texture atlas aside from the glyphs may be multicolored (i.e. not monochrome) and would therefore be stored on multiple RGBα color channels. In some embodiments, such images may be stored on separate texture atlases that store the images on all four RGBα color channels, and texture atlases may have a parameter that indicates whether it contains multi-colored images or monochrome glyphs.

The generated images of the glyphs may be provided to the frame buffer 208 prior to being added to one of the RGBα color channels in the texture atlas 210. The atlas index 206 may further comprise other character parameters associated with the glyph, such as UV array information for rendering the glyph texture, a width and height of the original image of the glyph before it was added to the texture atlas 210, and a position of the glyph image within the texture atlas 210. The position of the glyph image within the texture atlas 210 may be identified by the image height and width as is stored in the texture atlas 210, co-ordinates of the 2D position within the texture atlas 210, and the respective RGBα color channel that the glyph image is stored on.

Generated texture atlases 210 may be stored in a texture atlas storage 212. Multiple texture atlases 210 may be created and dynamically updated, as will be further described herein. The texture atlases 210 may vary in size, and may only be limited by compliance with appropriate application programming interfaces (for example, a hard limitation of 2048×2048 pixels for each texture atlas was established by the OpenGL ES APIs). Only physical limitations, such as the available storage in memory 112 may limit the number of texture atlases 210 that can be stored in the texture atlas storage 212. Glyphs may be retrieved from a texture atlas 210 within the texture atlas storage 212 and provided to the GPU 114 for rendering the glyphs when generating the UI.

In some scenarios, such as that described above, a glyph of a character may be added to a texture atlas 210, and/or a new texture atlas 210 may need to be created. This may occur during an initial configuration of a UI application running on the device 102, or it may occur if UI data requires a glyph of a character to be displayed that does not currently exist within a texture atlas.

In another scenario, a glyph that is to be rendered in a UI may already be stored in a texture atlas 210 within the texture atlas storage 212. Upon this determination, the position of the glyph within the corresponding texture atlas may be determined from atlas index 206 and accordingly the glyph can be provided to the GPU without needing to generate an image of the glyph, add the glyph and associated parameters to the atlas index 206, upload to the frame buffer 208, etc., as shown by the arrow in FIG. 2 connecting the font renderer 202 directly to the atlas index 206, and the atlas index 206 directly to the texture atlas 210.

Figure 3:
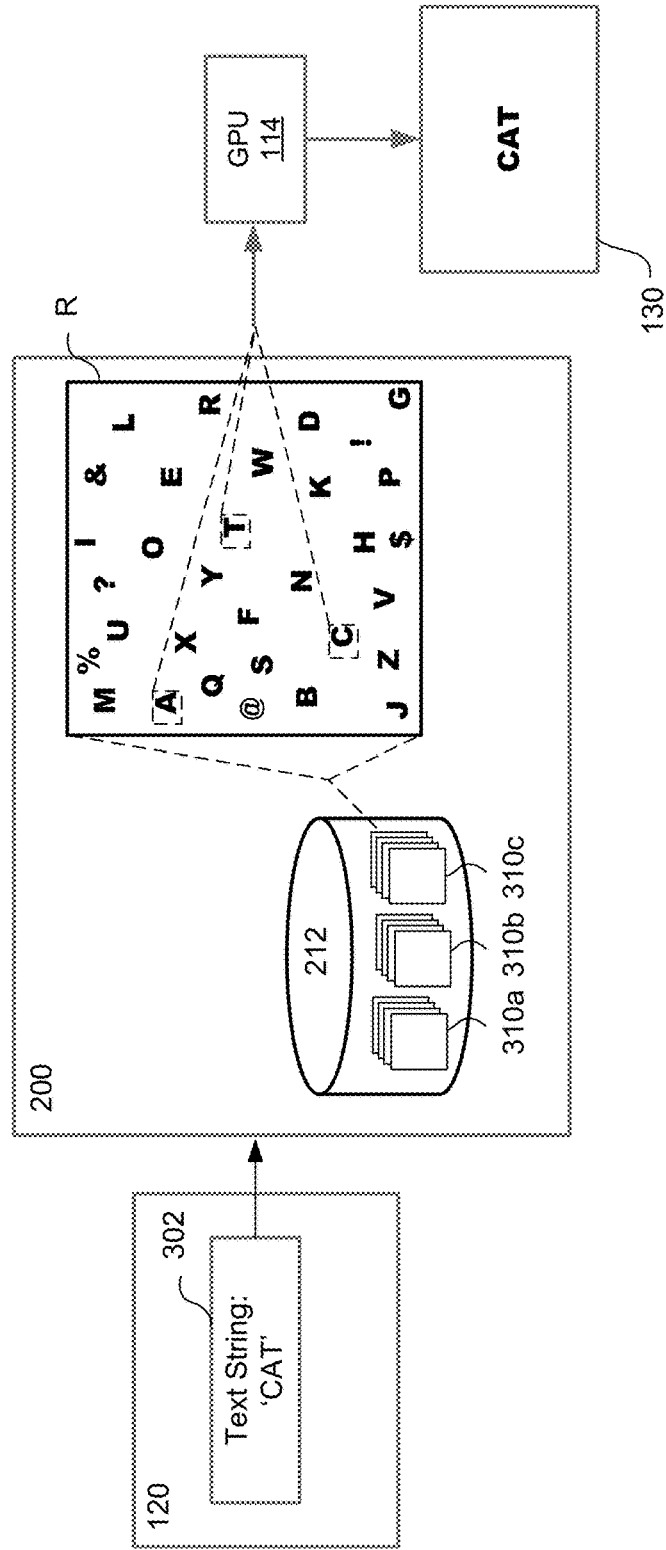
FIG. 3 shows a representation of rendering a UI.

FIG. 3 shows a schematic of rendering a UI. A text string 302, exemplary depicted as the characters 'CAT', is received at a device 102 within UI data 120 to be rendered for display on the device. The CPU 110 of the device 102 may then execute the UI generator 200 functionality. As will be further described herein, the UI generator 200 determines parameters of the text string 302 by identifying the characters 'C', 'A', and 'T', and for example, the font family and the font size. The UI generator 200 uses the one or more parameters of the characters received in the text string 302 to create and/or retrieve corresponding glyph images from a texture atlas that correspond to the parameters of the glyphs received in the text string 302.

As mentioned above and will be further described herein, the corresponding glyph images may already exist in a texture atlas within the texture atlas storage 212 (texture atlases are exemplary shown as texture atlases 310*a*, 310*b*, and 310*c*), or the glyphs may have to be added to either an existing texture atlas or to a new texture atlas. In FIG. 3, the corresponding glyphs required for rendering the text string 302 are depicted as being located within the red color channel of texture atlas 310*c*. The appropriate glyphs, i.e. 'C', 'A', and 'T' are retrieved from the texture atlas 310*c* and provided to the GPU 114. The GPU 114 may use the UV array information associated with the glyph textures to render the glyphs for display, as well as adding the appropriate color that the glyph is to be displayed in. Accordingly, the UI 130 is generated with the text string 'CAT' having been appropriately rendered therein.

Figure 4:
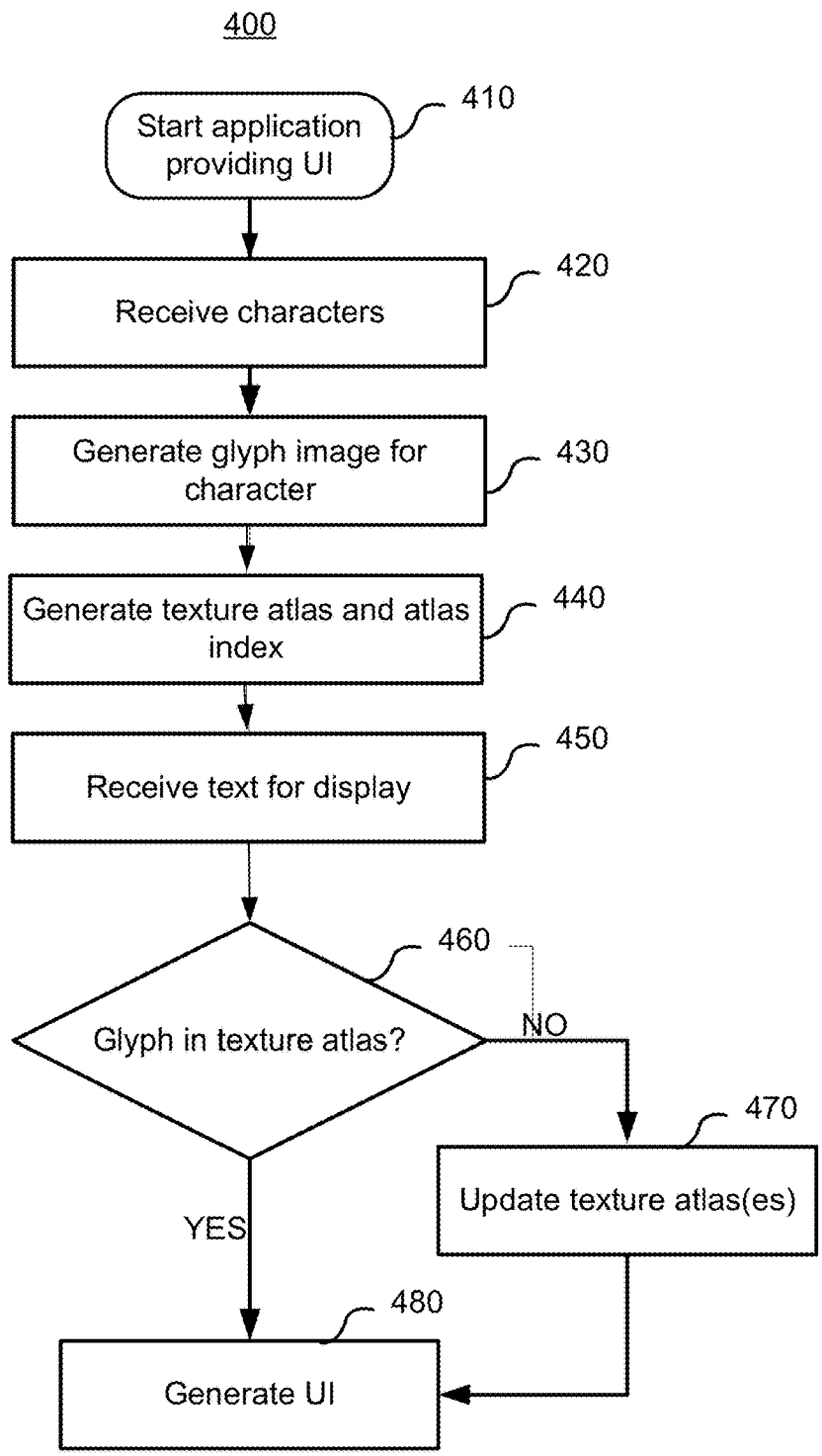
FIG. 4 shows a method of generating a UI using texture atlases.

FIG. 4 shows a method 400 of generating a UI. An initial configuration process (410-440) for generating texture atlases from input characters is performed, and a UI generation process (450-480) can utilize glyphs stored in texture atlases to generate the UI. The initial configuration process may be optionally performed upon start-up of a UI application on a device and may generate texture atlases with commonly used glyphs. For example, if the UI application is used for displaying EPG data for display to customers in the United States of America, where English is predominantly spoken, characters to be added during the initial configuration may correspond to textual characters within the English alphabet (e.g., 'A', 'B', 'C', 'D', etc.), numbers (e.g. '1', '2', '3', etc.), and other commonly used characters (e.g. '!', '?', ',', '.', etc.). The configuration file may vary depending on geographic location and/or the language commonly spoken by a user. In another example, such as in western European markets, the configuration file may include characters within the English alphabet and further include character variants with diacritical marks. The application providing the UI is started (410) and a configuration file or the like may be received (420). The configuration file may comprise the commonly used characters and parameters such as font size, font family, etc. Glyph images for the associated character is generated (430) and stored to a channel of a texture atlas (440). An atlas index is updated to identify the position within the texture atlas of the glyph image. The use of each color channel to store different glyphs can provide a 4× improvement in memory utilization. In addition, as will be described below, the texture atlas can be dynamically updated to include new glyph images as new characters are required by an associated application for display.

Text may be received (450) within UI data to be rendered for display at the device running the UI application. It is determined if respective characters within the text to be rendered exist within a texture atlas (460). If a character that is to be rendered in the UI does not exist within a texture atlas (NO at 460), the texture atlas is dynamically updated with the new glyph (470). Despite the initial configuration process used to add commonly used glyphs to texture atlases, scenarios may arise where a glyph to be rendered does not exist in a texture atlas. For example, referring to an example where EPG data as the UI data, a movie title may contain a character such as the letter 'ë'. Depending on what was deemed to be commonly-used characters within the configuration file, this character may not be considered to be commonly-used and may not exist within a texture atlas. Accordingly, the glyph for character 'ë' may be added to a texture atlas. Being able to add the glyph dynamically circumvents the need to store every conceivable glyph that could be required to be displayed upon initial configuration. Once the glyph has been added to a texture atlas, it may be used for generating the UI (480). If a glyph that is to be rendered in the UI already exists within a texture atlas (YES at 460), the UI may be generated using the existing glyph (480).

In some cases, the initial configuration process shown (420-440) may be omitted and texture atlases are dynamically updated with glyphs the first time that the character is to be used. Furthermore, receiving the text for display (450) may occur at any time during running of the UI application and may occur numerous different times (for example, EPG data may be provided or updated daily, and therefore receiving text for display may occur daily).

Figure 5:
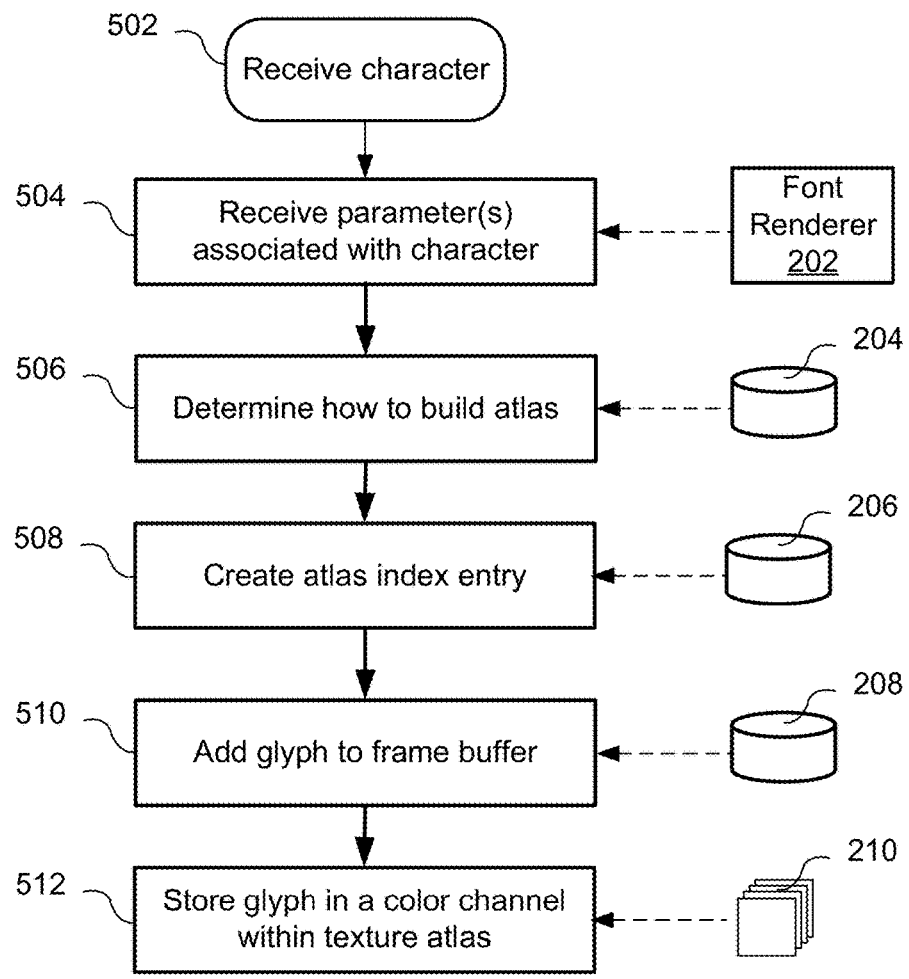
FIG. 5 shows a method of generating a texture atlas.

FIG. 5 shows a method 500 of generating a texture atlas. The method 500 may correspond to the generation of a texture atlas (440) of the UI generation method 400 described with reference to FIG. 4, and may be performed upon execution of the UI generator 200. A character is received (502) and one or more parameters associated with the character, such as font face, size, etc., are received (504), for example at the font renderer 202. Using, for example, rules/instructions contained with the font atlas 204, it is determined how to build an atlas index (506). An atlas index 206 is generated (508) with an entry corresponding to the respective character, and an image of the glyph for the character may be added to a frame buffer 208 (510). The glyph image is stored within one of the RGBα color channels within a texture atlas 210 (512), irrespective of an underlying color of the glyph.

An atlas entry may comprise information defining a position of the glyph image within the texture atlas as well as parameters of the glyph represented by the image. For example, parameters associated with a character may comprise any one or more of: font size, font family, original image width, original image height, and a UV array used to render the texture and color channels required. Most characters may be rendered using monochrome data, however, as previously mentioned a multicolored image may be stored on multiple channels if specific color elements or details are to be included. Information that may be used to define a position of the glyph image within the texture atlas may comprise an image height and width as stored in the texture atlas, a color channel within the texture atlas, and two-dimensional co-ordinates of the image within the respective color channel. Sample code for creating an atlas entry is provided below:

```
interface AtlasEntry {
  x: number;
  y: number;
  width: number;
  height: number;
  realWidth: number;
  realHeight: number;
  uvArray: Float32Array;
  uvCoords: WebGLBuffer;
  colorchannel: number;
}
```

Figure 6:
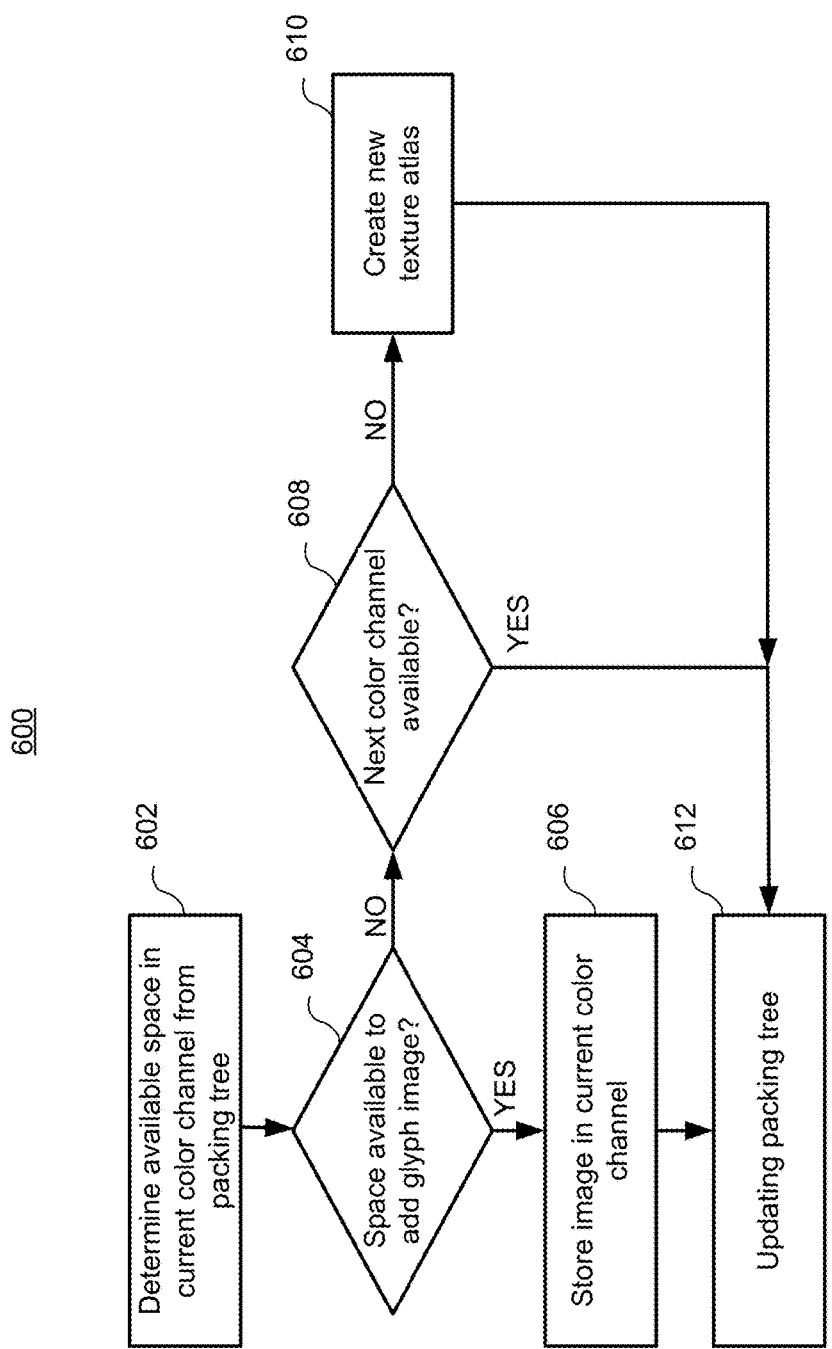
FIG. 6 shows a method of storing glyphs within a texture atlas.

FIG. 6 shows a method 600 of storing glyphs within a texture atlas. The method 600 may correspond to storing a glyph (512) of the texture atlas generation method 500 described with reference to FIG. 5, and may be performed during execution of the UI generator 200.

The available space in a current color channel of a texture atlas is determined (602), for example by using a binary packing tree, and it is determined if there is available space to add the glyph image (604). If there is available space to add the glyph image in the current color channel (YES at 604), the image is stored in the current color channel (606) and the packing tree is updated accordingly (612) to reflect the added glyph.

If there is no available space in the current color channel to add the glyph image (NO at 604), such as for example by reference to the associated binary packing tree, it is determined if there is another color channel available (608). For example, the UI generator 200 may attempt to add the glyph image in consecutive RGBα color channels within a texture atlas, and may begin with the red color channel, then the green color channel, then the blue color channel, and lastly the alpha color channel. If another color channel is available within the texture atlas (YES at 608), the packing tree is updated (612) to reflect the next color channel. The procedure returns to determining if there is available space in the current color channel (602). For example, if the original color channel was the red channel and there was no available space within the red color channel, it may be determined (608) that space is available in the green color channel within the same texture atlas. The binary packing tree is updated (612) to reflect the green color channel and the available space in the green color channel is determined (602).

If all the color channels have been used within the texture atlas (NO at 608), a new texture atlas is created (610). For example, if each of the red, green, and blue color channels within the texture atlas were previously determined to be full (i.e. no space to add the glyph image), and it is also determined (604) that there is no available space in the alpha color channel to add the glyph image, a new texture atlas must be created. The procedure may then update the packing tree (612) and continue for the next glyph entry. The packing tree is used to determine placement of the glyph within the texture atlas by tracking the position of the last glyph entry and the remaining horizontal and vertical space available within the atlas.

Figure 7:
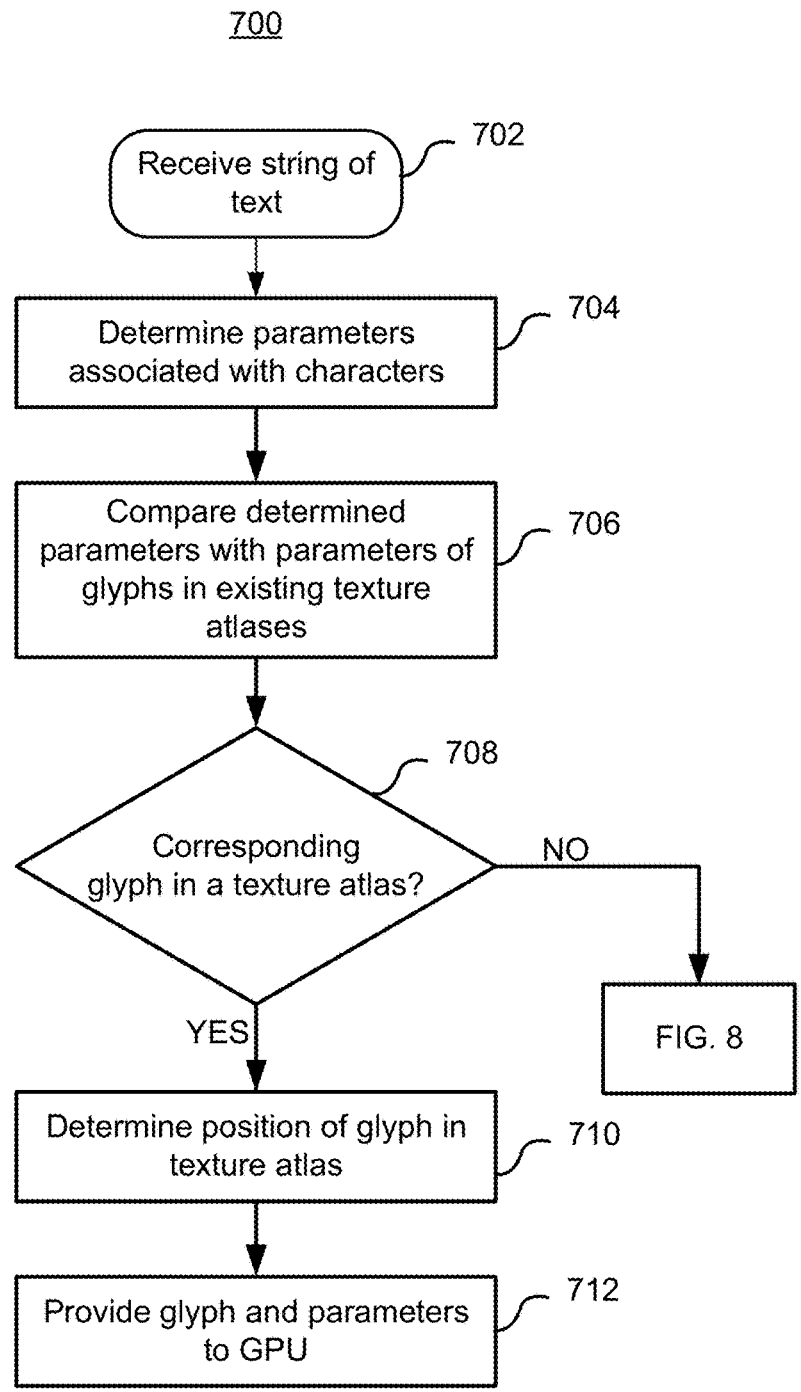
FIG. 7 shows a method of generating a UI in accordance with received characters.

FIG. 7 shows a method 700 of generating a UI in accordance with received characters. The method 700 may provide further details on the generation of glyphs (440-470) of the UI generation method 400 described with reference to FIG. 4, and may be performed during execution of the UI generator 200.

A string of text to be displayed in a UI is received (702) and parameters associated with characters within the string of text are determined (704). The character parameters, such as the font face, font size, etc., may be compared with parameters of glyphs that are stored in existing texture atlases (706). This comparison may be performed by checking the atlas entries associated with the glyphs stored in the texture atlases. A determination is made if a glyph corresponding to the character to be rendered exists in a texture atlas (708). The determination may be based on whether or not all of the parameters associated with the character to be rendered match with all of the parameters associated with a glyph stored in the texture atlas. If there is no corresponding glyph stored in an existing texture atlas (NO at 708), the glyph must be dynamically added to a texture atlas, as described with reference to FIG. 8.

If a determination is made that a glyph corresponding to the character to be rendered exists in a texture atlas (YES at 708), the position of the corresponding glyph is determined (710), for example from the atlas entry associated with the corresponding glyph that contains position information such as the color channel that the corresponding glyph is stored on within the texture atlas, the co-ordinates of the corresponding glyph within the color channel, etc. The corresponding glyph and parameters associated with the glyph, such as the UV array information used for rendering the glyph texture, is provided to the GPU (712) for display in the UI.

Figure 8:
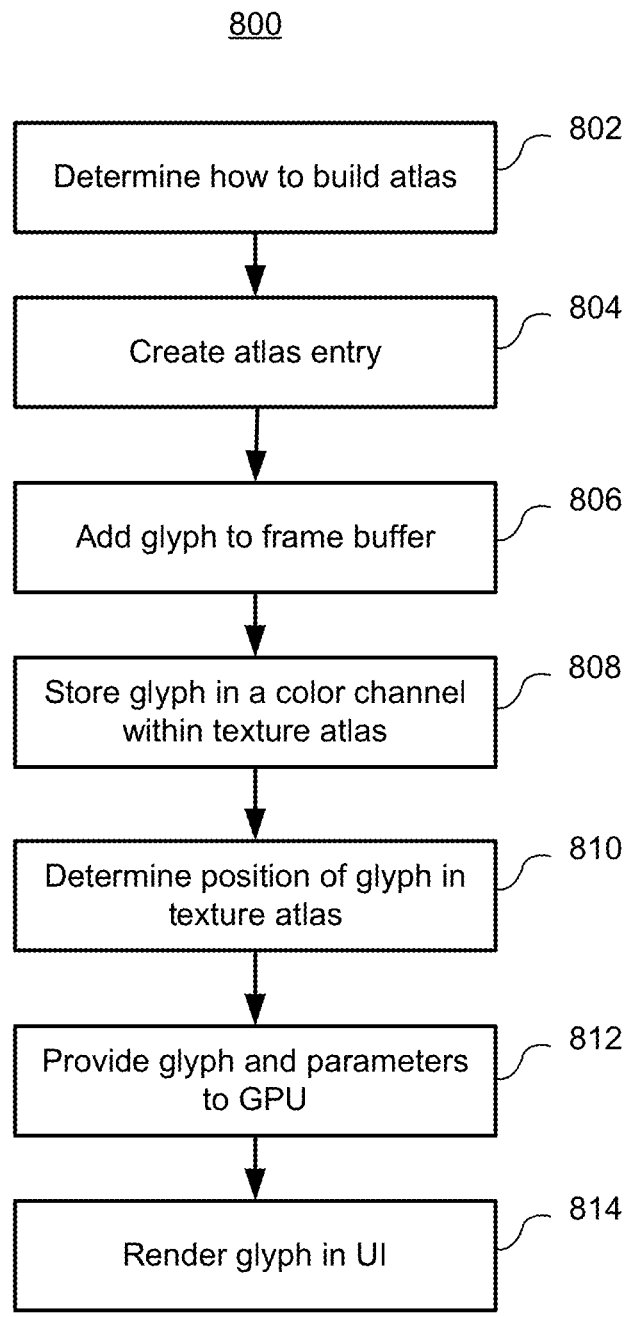
FIG. 8 shows a method of dynamically adding glyphs to a texture atlas.

FIG. 8 shows a method 800 of dynamically adding glyphs to a texture atlas. The method 800 may be performed during execution of the UI generator 200 when it has been determined that a glyph to be displayed does not currently exist within a texture atlas (NO at 708 in method 700). The method 800 may be similar to the method 500 for generating a texture atlas, and using, for example, the font atlas 204, it is determined how to build an atlas (802) based on the parameters associated with the received character (704) in FIG. 7. An entry within atlas index 206 is created (804), and an image of the glyph may be added to a frame buffer 208 (806). The glyph image is stored within one of the RGBα color channels within a texture atlas 210 (808).

Since the glyph has been dynamically added to a texture atlas in response to the received text to be displayed (702), the position of the glyph within the texture atlas is determined (810) and provided to the GPU (812) along with other parameters associated with the character. The glyph image can be rendered in the UI accordingly, and the newly-generated glyph remains stored in the texture atlas for possible future use.

Figure 9:
FIG. 9 shows an exemplary texture atlas generated in accordance with the teachings herein.

FIG. 9 shows an exemplary texture atlas 900 generated in accordance with the teachings herein. As shown in the texture atlas 900, glyphs have been stored on all four RGBα color channels within the texture atlas 900. As previously mentioned, this allows for more efficient memory usage.

Figure 10A:
Figure 10B:
Figure 10C:
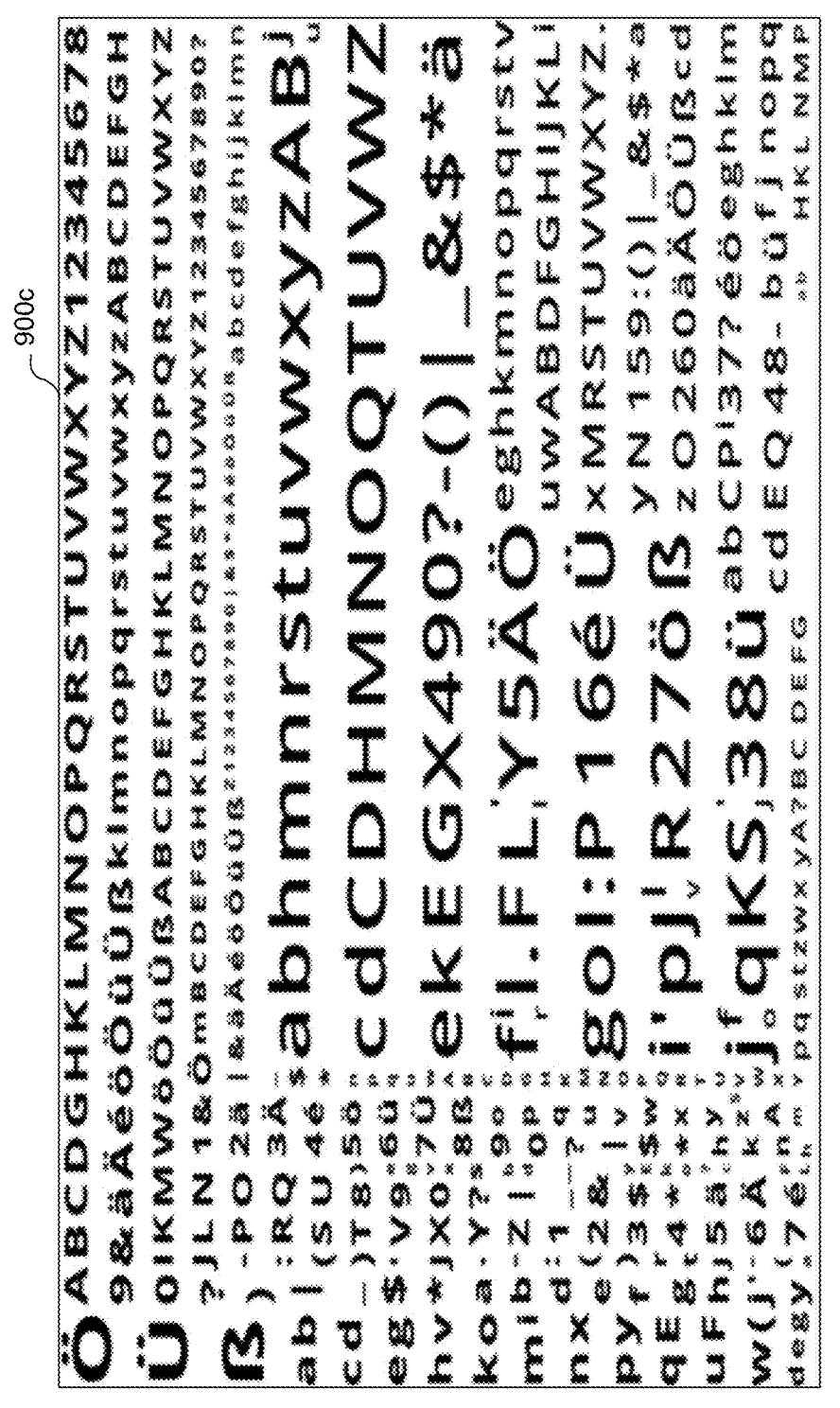
Figure 10D:
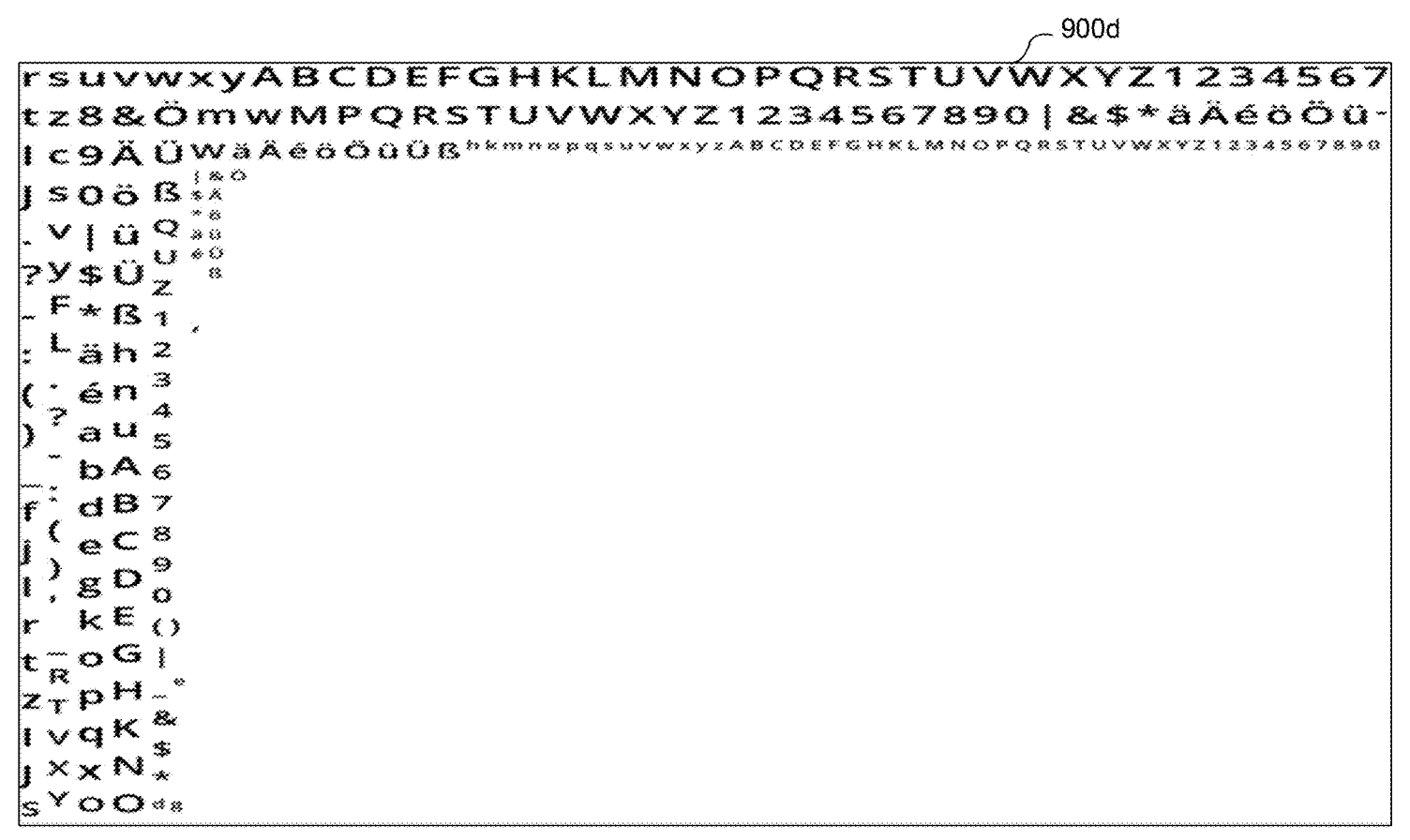

The glyphs stored on the respective RGBα color channels are depicted in FIGS. 10A thru 10D, where FIG. 10A shows the red color channel 900*a* of the texture atlas 900, FIG. 10B shows the green color channel 900*b* of the texture atlas 900, FIG. 10C shows the blue color channel 900*c* of the texture atlas 900, and FIG. 10D shows the alpha color channel 900*d* of the texture atlas 900.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-10 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A method of glyph management performed by a processor, comprising:
   receiving one or more characters;
   generating a glyph image for each of the one or more characters;
   for each generated glyph image:
   storing the glyph image in only one of a plurality of red, green, blue, and alpha (RGBα) consecutive color channels of a texture atlas stored on a memory coupled with the processor;
   receiving at least one parameter associated with each glyph image; and
   creating an entry for the glyph image in an associated atlas index stored on the memory, the entry defining the character represented by the glyph image, a position of the glyph image within the texture atlas, and the at least one parameter of the respective character represented by the glyph image in the atlas index wherein the at least one parameter associated with each of the glyph images comprises any one or more of font size, font family, original image width, original image height, and a UV array;
   wherein for consecutive color channels of the RGBα color channels within the texture atlas:
   determining from the atlas index available space within a current color channel of the texture atlas for storing the glyph image;
   if there is available space within the current color channel for storing the glyph image, storing the glyph image within the current color channel; and
   if there is no available space within a first channel for storing the glyph image, determining available space within a next consecutive color channel for storing the glyph image,
   wherein the glyph image is stored in the next consecutive color channel if there is available space within the next consecutive color channel and if there are no remaining color channels, a new texture atlas is created;
   wherein an associated glyph image can be retrieved from one of the plurality of color channels of the texture atlas when required for rendering of an associated character in a user interface generated by an application executed by the processor.

2. The method of claim 1, wherein the glyph image is added to a frame buffer prior to being stored in the texture atlas.

3. The method of claim 1, wherein the glyph image is stored in one of the RGBα color channels irrespective of a color of the respective character represented by the glyph image.

4. The method of claim 1, wherein the available space is determined in consecutive color channels beginning with the red color channel, then the green color channel, then the blue color channel, and then the alpha color channel.

5. The method of claim 1, wherein the position of the glyph image comprises one or more of: glyph image width, glyph image height, two-dimensional co-ordinates, and the color channel that the glyph image is stored on.

6. The method of claim 1, performed during an initial configuration of the texture atlas at an initial start-up of an application.

7. The method of claim 1, further comprising:
   receiving a string of text comprising one or more glyphs to be displayed in a user interface (UI);
   identifying each of the one or more glyphs within the string of text;
   determining one or more parameters associated with each of the one or more identified glyphs; and
   determining, for each character identified within the string of text, if a corresponding glyph image is stored in the texture atlas based on the one or more parameters determined for the respective identified character.

8. The method of claim 7, wherein if the corresponding glyph image of the identified glyph is stored in the texture atlas, the method further comprises:
   determining a position of the corresponding glyph image from an entry in the atlas index associated with the corresponding glyph image; and
   providing the corresponding glyph image to a graphics processor for rendering the corresponding glyph image in the UI.

9. The method of claim 7, wherein the corresponding glyph image is determined to be stored in the texture atlas if each of the one or more parameters of the identified character within the text string matches each of the at least one parameter associated with a glyph image stored in the texture atlas.

10. The method of claim 7, wherein if there is no corresponding glyph image of the respective identified character stored in the texture atlas, the method further comprises:
   creating the glyph image of the identified character;
   storing the glyph image in one of the RGBα color channels of the texture atlas; and
   creating an entry associated with the glyph image in the associated atlas index, the entry defining a position of the glyph image within the texture atlas and is associated with the at least one parameter of the identified character represented by the glyph image.

11. The method of claim 10, further comprising:
   providing the corresponding glyph image to a graphics processor for rendering the corresponding glyph image in the UI.

12. The method of claim 7, wherein the string of text is received from any one or more of electronic programming guide (EPG) data, channel list data, media-on-demand data, application store data, and HTML data.

13. A system configured to perform glyph management, comprising:
   a memory for storing a texture atlas comprising red, green, blue, and alpha (RGBα) color channels and an associated atlas index; and
   a processor operably coupled with the memory, the processor generating a glyph image for each for each of a received one or more characters and at least one parameter associated with each glyph image and storing the generated glyph image to only one of the color channels of the texture atlas and storing an atlas index for the glyph image in the associated atlas index, the atlas index defining the character represented by the glyph image, a position of the glyph image within the texture atlas and the at least one parameter of the respective character represented by the glyph image in the atlas index wherein the at least one parameter associated with each of the glyph images comprises any one or more of font size, font family, original image width, original image height, and a UV array;
   wherein for consecutive color channels of the RGBα color channels within the texture atlas, the atlas index available space is determined within a current color channel of the texture atlas for storing the glyph image and if there is available space within the current color channel for storing the glyph image, otherwise the glyph image is stored within the current color channel and if there is no available space within a first channel for storing the glyph image, determining available space within a next consecutive color channel for storing the glyph image, the glyph image is stored in the next consecutive color channel if there is available space within the next consecutive color channel and if there are no remaining color channels, a new texture atlas is created;
   wherein an associated glyph image can be retrieved from one of the channels of the texture atlas using the atlas index when rendering of an associated character in a user interface generated by an application executed by the processor.

14. The system of claim 13, further comprising:
   a graphics processor operably coupled with the memory and the processor, the graphics processor receiving the associated glyph image retrieved from one of the channels of the texture atlas, combining the associated glyph image with a color that the associated glyph image is to be drawn for display in the user interface.

15. The system of claim 13 wherein the texture atlas is dynamically updated when a new character is received by the processor which does not have an associated glyph image in one of the channels of the texture atlas.

16. A non-transitory computer readable medium comprising computer-executable glyph management instructions stored thereon, the glyph management instructions comprising:
   receiving one or more characters;
   generating a glyph image for each of the one or more characters;
   for each generated glyph image:
   storing the glyph image in only one of a plurality of red, green, blue, and alpha (RGBα) consecutive color channels of a texture atlas stored on a memory coupled with the processor;
   receiving at least one parameter associated with each glyph image;
   creating an entry for the glyph image in an associated atlas index stored on the memory, the entry defining the character represented by the glyph image, a position of the glyph image within the texture atlas and the at least one parameter of the respective character represented by the glyph image in the atlas index wherein the at least one parameter associated with each of the glyph images comprises any one or more of font size, font family, original image width, original image height, and a UV array;
   wherein for consecutive color channels of the RGBα color channels within the texture atlas:
     determining from the atlas index available space within a current color channel of the texture atlas for storing the glyph image;
     if there is available space within the current color channel for storing the glyph image, storing the glyph image within the current color channel; and
     if there is no available space within a first channel for storing the glyph image, determining available space within a next consecutive color channel for storing the glyph image,
   wherein the glyph image is stored in the next consecutive color channel if there is available space within the next consecutive color channel and if there are no remaining color channels, a new texture atlas is created;
   wherein an associated glyph image can be retrieved from one of the plurality of color channels of the texture atlas when required for rendering of an associated character in a user interface generated by an application executed by a processor.

* * * * *